United States Patent [19]

Lutz et al.

[11] Patent Number: 5,333,504
[45] Date of Patent: Aug. 2, 1994

[54] HIGH OVERPRESSURE LOW RANGE PRESSURE SENSOR

[75] Inventors: Mark A. Lutz, Minneapolis; William B. Krueger, Bloomington, both of Minn.

[73] Assignee: Rosemount Inc., Eden Prairie, Minn.

[21] Appl. No.: 938,954

[22] Filed: Sep. 1, 1992

[51] Int. Cl.⁵ .............................. G01L 7/08; G01L 9/06
[52] U.S. Cl. ...................................... 73/727; 73/720; 73/721; 73/726; 338/4
[58] Field of Search .................. 73/716, 728; 361/283; 338/4

[56] References Cited

U.S. PATENT DOCUMENTS

| | | | |
|---|---|---|---|
| 3,213,400 | 10/1965 | Gieb | 338/4 |
| 3,341,794 | 9/1967 | Stedman | 338/4 |
| 4,093,933 | 6/1978 | Wilner | 338/42 |
| 4,236,137 | 11/1980 | Kurtz et al. | 338/4 |
| 4,879,627 | 11/1989 | Grantham | 361/283 |
| 4,905,575 | 3/1990 | Knecht et al. | 92/103 |
| 4,930,043 | 5/1990 | Wiegand | 361/283 |
| 4,949,581 | 8/1990 | Rud, Jr. | 73/718 |
| 5,062,302 | 11/1991 | Petersen et al. | 73/754 |
| 5,070,735 | 12/1991 | Reichert et al. | 73/727 |

OTHER PUBLICATIONS

"An Integrated Membrane Pressure Transducer With Rigid Center", Pub. Dec. 1978, p. 93-4 of Izvestiya Vysshikh Uchebnykh Zevedenii, Radioelektronika, vol. 21, No. 12, by P. P. Polivanov (no translation).

Paper presented at Society of Instrument and Control Engineers (SICE), Jul. 1985, Yokogawa Electric (translation).

*Primary Examiner*—Donald Woodiel
*Attorney, Agent, or Firm*—Westman, Champlin & Kelly

[57] ABSTRACT

A low range pressure sensor includes a base plate of brittle material, and a diaphragm plate mounted on the base plate and sealed around a periphery to the base plate. Pressures are introduced to cause the diaphragm to deflect toward the base plate, and the deflection of the diaphragm is sensed through strain gauges to provide an indication of the pressure. The diaphragm is provided with a plurality of individual support posts on a side facing the base plate, so that when the diaphragm is deflected toward the base plate under high overpressures the support posts will support the diaphragm against movement to avoid failure or breakage of the diaphragm. The number of support posts can be varied as desired. In a preferred form of the invention, the base plate is provided with a very thin layer of silicon dioxide, which is a good electrical insulator and which also serves to help accommodate slight movement of the support posts as they touch the surface of the base plate to reduce stress buildup in the diaphragm as the overpressure increases.

11 Claims, 5 Drawing Sheets

HIGH OVERPRESSURE LOW RANGE PRESSURE SENSOR

BACKGROUND OF THE INVENTION

The present invention relates to a deflecting diaphragm utilizing a brittle material diaphragm that deflects under pressure relative to a base plate and which is supported against damage when under high overpressures relative to the normal sensor range.

Semiconductor pressure sensors, which utilize a backing plate and a diaphragm that deflects under pressure, are known in the prior art. The deflection is measured in such prior art sensors in a number of ways, including capacitive sensing, and using strain gauges that are mounted on the diaphragm. The use of brittle material such as silicon, glass and quartz for diaphragms has also been known.

The need for protection of brittle material diaphragms when subjected to overpressure has been recognized. In general, such support has been obtained by resting the diaphragm surface across a facing surface of the base plate, which may be configured to match the deflected diaphragm configuration, so that when the diaphragm slightly exceeds its maximum design pressure sensing range it will be supported on the base. Preferably a substantial portion of the diaphragm will rest on a facing surface of the base. Recesses have been used in base plates and on diaphragms to attempt to ensure a full, continuous overpressure support across the deflecting portion of the diaphragm.

SUMMARY OF THE INVENTION

The present invention relates to a pressure sensor that utilizes a base plate and a diaphragm which is deflected under pressure relative to the base plate. The diaphragm is made of brittle material and has suitable sensing means thereon to provide an output indicative of the pressure applied to the diaphragm.

Overpressure protection is provided by a plurality of short posts or bumps formed on a diaphragm, or if desired on the base plate, which will support the deflecting diaphragm under overpressure at a plurality of locations on the diaphragm to provide support and protection against overpressure. By using a plurality of short posts, the diaphragm is not stiffened and thus it behaves as though the posts were not there until excess pressure is applied, and it also eases the manufacturing process, therefore widening the overpressure stop gaps because the less stiff diaphragm can travel farther than one with a large stiff center.

In the form shown, a silicon wafer is etched to provide a thin portion that forms a deflecting web of a diaphragm, and is masked to leave a plurality of posts that have a height equal to the original thickness of the wafer from which the diaphragm is being formed. A rim surrounding the plurality posts is left for attachment to the base plate.

During the etching process the support posts become substantially pyramid shaped.

It has also been discovered that having a layer of silicon dioxide on the surface of the base plate, which is not as brittle as pure silicon, permits the posts to shift slightly in the thin layer of silicon dioxide after the posts first contact the support layer and as the overpressure increases. The curve or bow of the deflecting diaphragm causes the posts to be at a slight angle as they first contact the base plate. As pressure increases, there is a slight shifting of the outer ends of the posts relative to the support layer. The silicon dioxide layer forms electrical isolation for the base plate from the surface it is to be mounted upon. The silicon dioxide layer also enhances the overpressure capability of the sensor by allowing the support posts to adjust position to avoid raising higher stress levels in the diaphragm. The hard silicon surface of the base layer, without the silicon dioxide layer, reduces the ability of the posts to shift as the overpressure increases.

DETAILED DESCRIPTION OF THE PREFERRED EMBODIMENTS

Figure 1:
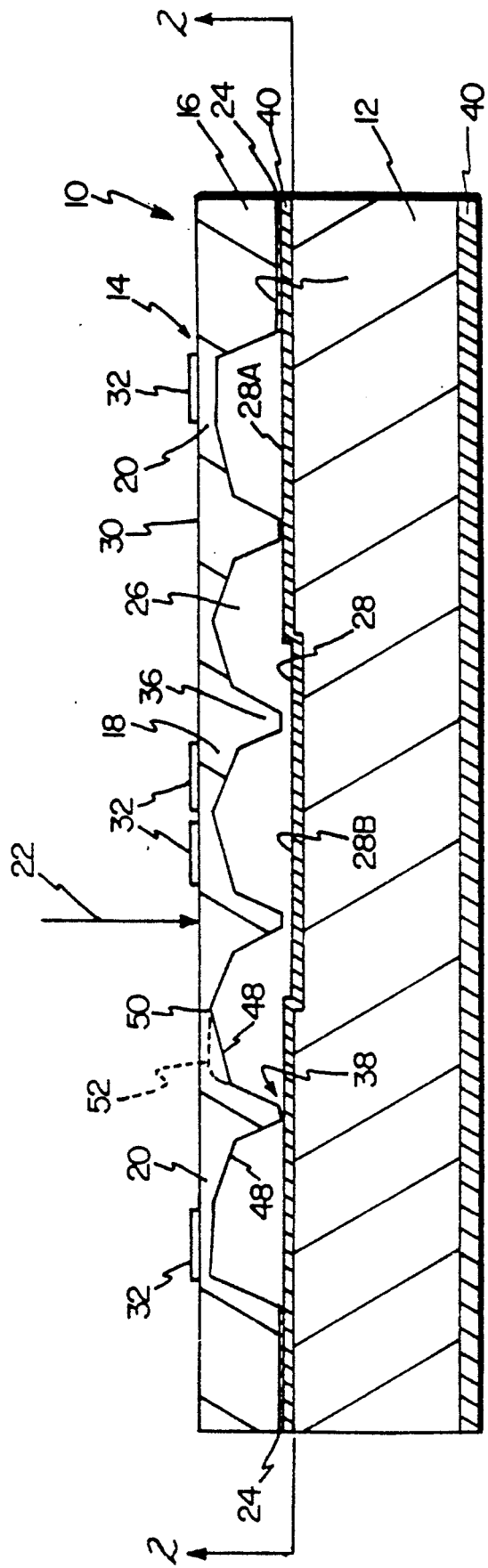
FIG. 1 is a cross-sectional schematic representational view of a typical sensor used for sensing pressure and made according to the present invention.

Referring to FIG. 1, a pressure sensor made according to the present invention is illustrated at 10. The pressure sensor is a low range pressure sensor, for example, in the range of 30 psi gauge, either gauge or absolute, but having the ability to handle overpressures that are a substantial multiple of such range. The gauge pressure sensor would have an opening through the base plate, open to the diaphragm area. The pressure sensor of the present invention could be a capacitive sensing unit. Comparable prior art pressure sensors generally will withstand three to eight times the rated pressure without breakage. The present pressure sensor will withstand 5 to 10 times more overpressure than a comparable diaphragm without posts.

The pressure sensor 10 comprises a base plate or layer of a brittle material indicated at 12. Such material may be a semiconductor such as silicon, which is the preferred material, but could also be other brittle material such as glass, sapphire, quartz or the like. The base plate supports a diaphragm plate assembly 14, which includes a peripheral rim member 16 which bounds a deflecting diaphragm or web section 18. The deflection of the diaphragm web section 18 versus pressure is determined by the diaphragm web thickness in a bounding region adjacent to the rim 16, which region is shown at 20 on the sides of the diaphragm web in FIGS. 1 and 2 and also by the thickness between the posts. The amount of deflection of the diaphragm web is very small across the operative range, and if excessive deflection occurs the diaphragm will break.

The rim 16 surface is suitably bonded to the base plate 12. For example, a glass frit in the interface region indicated at 24 can be used for bonding the diaphragm to the base plate upper surface 28, or the base and diaphragm can be joined at the rim using anodic bonding or fusion techniques. The bonding of the diaphragm rim to the base plate leaves a chamber indicated at 26 beneath the diaphragm web section 18 and above the upper surface 28 of the base plate 12. A vacuum is created when the die is sealed to the base plate 28 with the glass frit 24. The pressure or force to be measured is applied as indicated by the arrow 22 against an upper surface 30 of the diaphragm web 18. This will cause the diaphragm web to bow toward the base plate 12, and the amount of deflection of the diaphragm web can be measured with suitable strain gauges indicated at 32 on the upper surface 30 of the diaphragm web to provide an indication of the amount of force or pressure applied, as a function of the deflection.

In the preferred embodiment, in order to provide a support for the diaphragm web 18 as it bows downwardly, and to prevent the diaphragm from being fractured, damaged or otherwise broken, a plurality of support posts indicated at 36 are integrally formed on the diaphragm web 18 and on a side of the diaphragm web opposite from the application of force or pressure. These posts 36 face toward the upper surface 28 of the base plate or layer 12. As shown, in FIG. 2, there are 16 such posts, but a different number can be used. For example, four, eight or nine posts for supporting the diaphragm web 18 can be used for overpressure protection, depending in part on the size of the diaphragm.

The posts 36 are formed by etching a wafer of silicon or other material from which the diaphragm is made, as the diaphragm web 18 is etched to proper thickness, in a batch process, utilizing a suitable mask that forms the posts 36 into substantially pyramid-like sections that, as shown, have a flat tip 38 that is the same height from the surface 30 as the surface of the rim 16 that contacts the base plate 12. The posts can be of different heights, if desired, to achieve substantially uniform contact with a base plate with a flat surface across the diaphragm taking into account the bowed shape of the diaphragm under pressure.

Figure 1A:
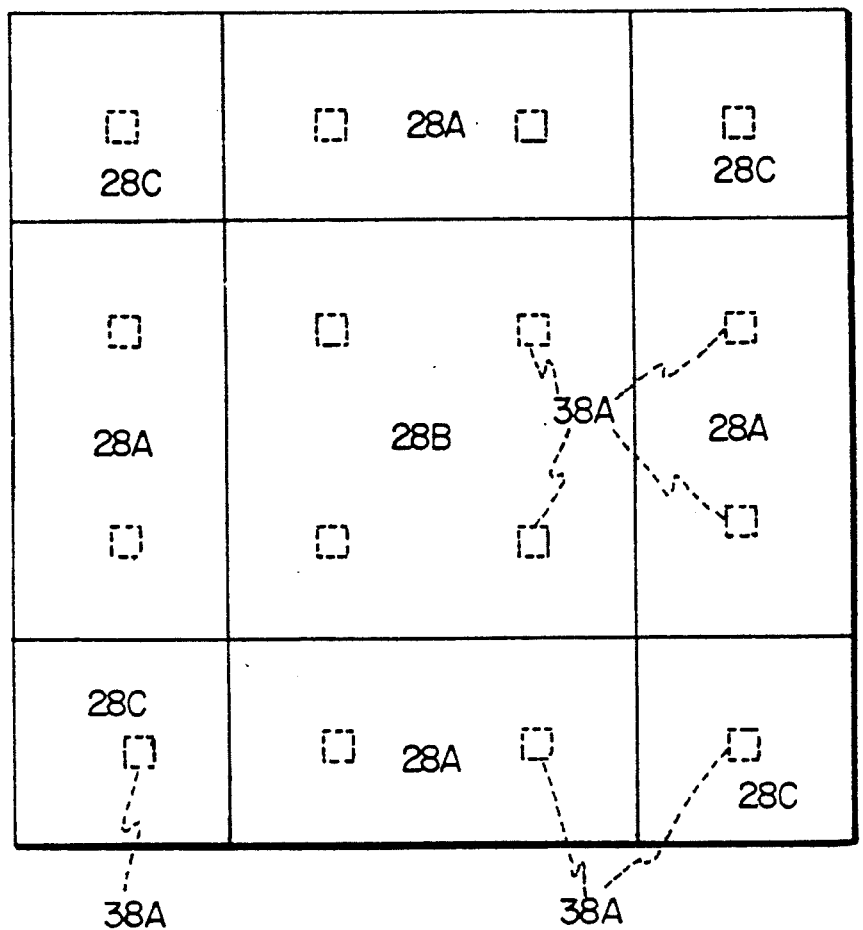
FIG. 1A is a view of the base plate surface with a diaphragm layer removed.

As shown in FIG. 1A, the upper surface 28 of base plate 12 is recessed in selected areas from the plane of the edge portions where the diaphragm rim is bonded. For a 16 post configuration, sections 28A are along two sides and between adjacent corner sections 28C. Corner sections 28C are less in depth than the other parts. Sections 28A are recessed more than sections 28C, but are closer to the posts than the center section indicated at 28B (most recess depth). The difference in recess depth is to accommodate the differences in deflection, because the diaphragm web 18 will deflect more in the center than it will adjacent to the rim 16, and the steps in the surface 28 of base plate 12 provide substantially simultaneous contact between the corners and outer rows of posts 36 and the surface portion 28C and 28A and between the posts located near the center of diaphragm web 18 and the surface portion 28B. Again, as stated, the same effect can be obtained with a flat surface on base plate 12 and post 36 of different heights, with the shortest posts 36 near the center of the diaphragm web 18.

As the diaphragm web 18 deflects, the tips 38 of the posts 36 will contact their respective surface portions 28A, 28B and 28C, and be held against further deflection under increasing pressure. The overpressure applied along the line 22 can exceed the normal operating pressure by many times without damaging the diaphragm web 18.

Figure 3:
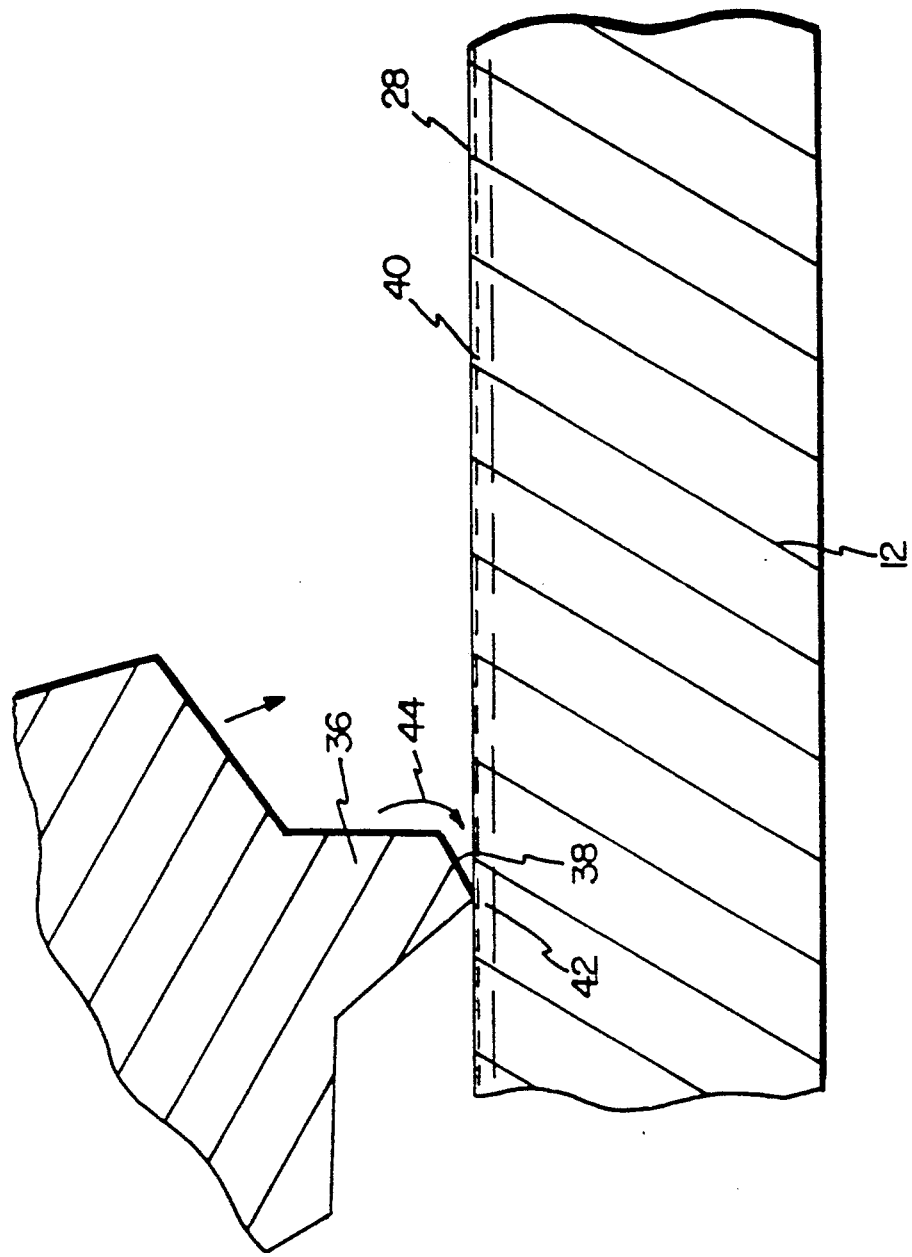
FIG. 3 is a schematic representation illustrating, in greatly exaggerated detail, the movement of the support posts from the time of first contacting the base layer to full overpressure conditions.

It has also been noted that when silicon is used as a base plate, it is desirable to have an electrically insulating layer on the surface, and as shown in FIGS. 1 and 3, a layer 40 (about three microns thick) represented by dotted lines is silicon dioxide that has been grown on the surface of the silicon base plate. However, it has been found that as the diaphragm web 18 is bowing toward the base plate, the posts 36 will be slighted canted, so that a corner or edge indicated at 42 of the flat top 38 may first contact the upper surface 28 of the base plate 12, rather than having the flat surface 38 of posts 36 contact the layer 40 across the full width of the flat surface 38. As the diaphragm web 18 deflects further under greater pressure, it has been found that these posts 36 will tend to rotate generally as shown by the arrow 44 as the diaphragm web becomes less bowed to fully seat the end surfaces 38. If the diaphragm web 18 moves slightly after initial contact, the post corner will dig into the silicon dioxide layer and will tend to form a little channel or groove whereas, if the untreated silicon surface is engaged, there will be less sliding, and the diaphragm may fail in tension.

Figure 2:
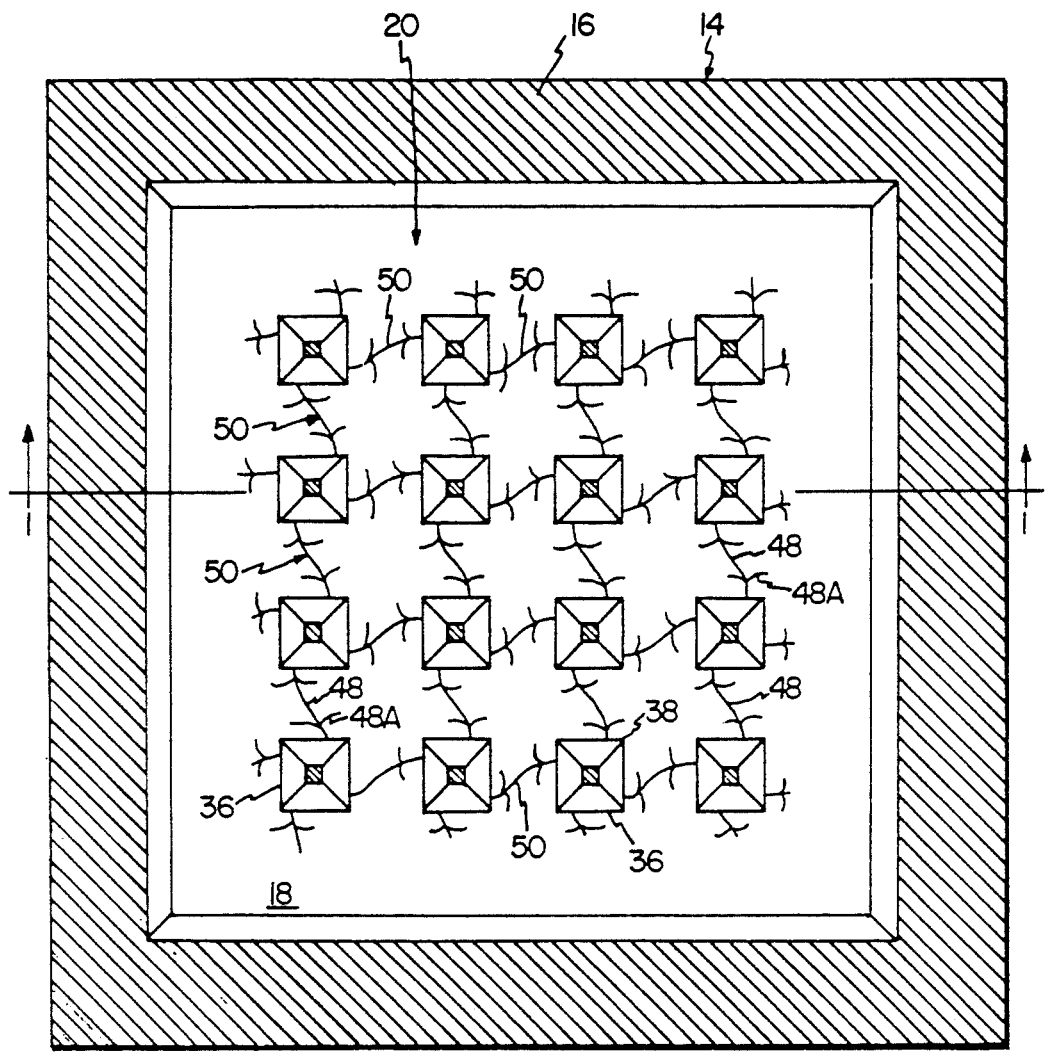
FIG. 2 is a view of support posts of the diaphragm portion of FIG. 1, taken as on line 2—2 in FIG. 1.
Figure 4:
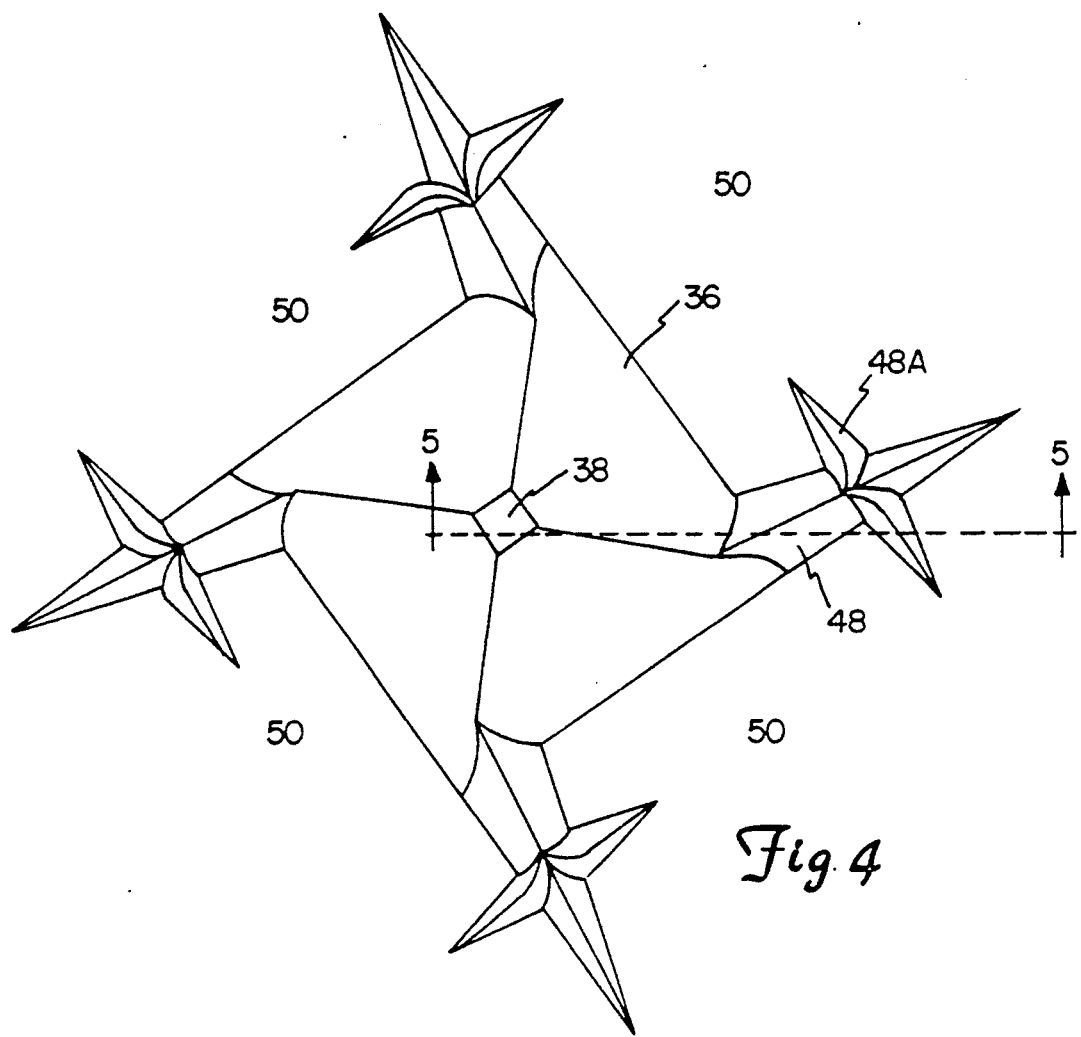
FIG. 4 is an enlarged detailed view of a single support post showing the details of the etching surface of an individual post as its configuration would be etched without posts adjacent to it.
Figure 5:
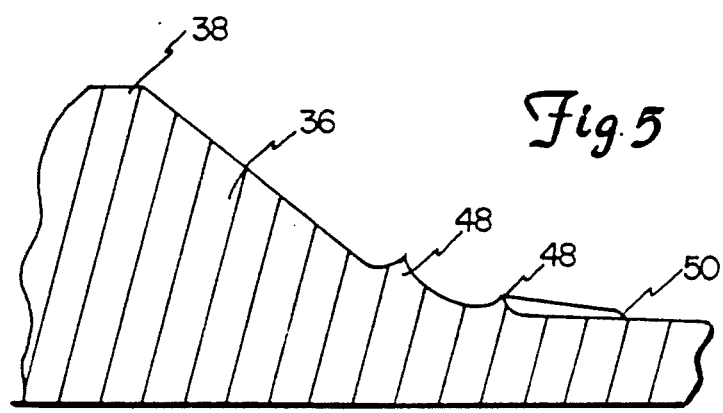
FIG. 5 is a sectional view taken as on line 5—5 in FIG. 4.

It should also be noted in FIGS. 1, 2 and 4 that at the bases of each of the posts 36, due to interaction of the etching materials and the post masks, complex surface configurations 48 are formed. The etching leaves tapered surface 48 extending from the corners, and small spurs 48A extend laterally from the tapered surfaces or ribs at locations spaced from the posts at a shallow angle, so that the tapered base surfaces of the posts intersect in regions shown at 50. A dotted line representation at 52 in FIG. 1 is the true designed form of the base post with the thickness of the remaining diaphragm web between posts equal to that shown at 20. These tapered surfaces are depicted in FIG. 2, only very schematically and as can be seen, the tapers are not squared with the major sides of the posts. Thus, FIG. 1 is an illustrated cross section in the tapered surface region. The configuration of the surface between the posts can be different without substantially affecting the performance.

The silicon dioxide layer 40 permits the posts to shift slightly and reduce diaphragm breakage. The overpressure protection posts 36 are quite easily manufactured, as are the other components of the sensors, so costs are not a substantial factor.

The posts 36 are shown as being formed integrally as part of the diaphragm, but the posts also could be formed to extend up from the base plate to provide overpressure protection.

The recessed regions of the base plate surface will change in shape, size and location as the number of posts change to provide the benefits of the posts all contacting the surface at substantially the same time. For example, a diaphragm with four posts would be used with one planar surface, recessed from the rim. Different numbers of posts require different surface depths to digitally approximate the bowed diaphragm shape when under pressure for adequate support.

A suitable housing or pressure containment plate will be used over the diaphragm for containing the pressure acting on the diaphragm. Such housing is not shown because they are well known.

The same conceptual construction can be used with capacitive sensing for sensing diaphragm deflections, by using a conductive film on a plate spaced from the diaphragm to form a capacitive plate insulated from the diaphragm, with suitable leads attached to the conductive film and the diaphragm.

Although the present invention has been described with reference to preferred embodiments, workers skilled in the art will recognize that changes may be made in form and detail without departing from the spirit and scope of the invention.

What is claimed is:

1. A pressure sensor comprising a base plate, a diaphragm plate including a rim secured to the base plate, and a central diaphragm web section that is deflectable under force toward the base plate comprising;

a plurality of posts formed on one of said plates in registry with the deflectable web section, and forming stops when the deflectable web section is deflected toward the base plate a preselected amount, said plurality of posts being integrally formed with said deflectable web section of said diaphragm and having ends which engage the base plate for forming the stops.

2. The sensor of claim 1 wherein said posts have outer end surfaces that are substantially planar for contacting a facing surface of the base plate when the diaphragm is deflected a preselected amount toward the base plate.

3. The sensor of claim 2 and a layer of oxide formed on said base plate forming a shallow layer that is of a different material than the posts, to permit slight shifting of the ends of the posts as they contact the base plate.

4. The sensor of claim 3 wherein said base plate is made of silicon, and the shallow layer is formed of silicon dioxide.

5. The sensor of claim 4 wherein the silicon dioxide is substantially three microns thick.

6. The sensor of claim 5 wherein the base plate has a surface facing the posts, which is recessed a greater depth in the regions in registry with the central portions of the deflectable web section than at the edges of the base plate underlying the rim section.

7. The sensor of claim 1 wherein there is a plurality of at least four posts on the diaphragm web section.

8. A pressure sensor comprising a base plate, a diaphragm plate including a rim secured to the base plate, and a central diaphragm web section that is deflectable under force toward the base plate comprising;

a plurality of posts formed on one of said plates in registry with the deflectable web section, and forming stops when the deflectable web section is deflected toward the base plate a preselected amount, the plurality of posts comprising at least four posts on the diaphragm web section.

9. The sensor of claim 8 wherein there are 16 posts evenly spaced on the diaphragm web section.

10. A pressure sensor comprising a base plate having a central portion, a diaphragm plate including a rim secured to the base plate, and a central diaphragm portion having a deflectable web section deflectable under force toward the base plate, comprising;

a plurality of posts formed on one of said plates in registry with the deflectable web section, and forming stops when the deflectable web section is deflected toward the base plate a preselected amount;

the plate other than the one plate having a surface facing the posts, which surface is recessed a greater depth in central portions of the other plate than at edges thereof.

11. The sensor of claim 10 and wherein the posts are carried by the deflectable web section and the other plate is the base plate, the posts having ends which engage surface of the base plate, and a layer of oxide formed on the surface of the base plate forming a shallow layer that is not as hard as the base plate, to permit slight shifting of the ends of the posts as the posts contact the surface of the base plate.

* * * * *